US011836079B2

(12) United States Patent
Hao et al.

(10) Patent No.: US 11,836,079 B2
(45) Date of Patent: Dec. 5, 2023

(54) STORAGE MANAGEMENT APPARATUS, STORAGE MANAGEMENT METHOD, PROCESSOR, AND COMPUTER SYSTEM

(71) Applicant: Alibaba Group Holding Limited, Grand Cafyman (KY)

(72) Inventors: Ziyi Hao, Hangzhou (CN); Chen Chen, Shanghai (CN); Xiaoyan Xiang, Shanghai (CN); Feng Zhu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 17/021,716

(22) Filed: Sep. 15, 2020

(65) Prior Publication Data

US 2021/0089451 A1 Mar. 25, 2021

(30) Foreign Application Priority Data

Sep. 24, 2019 (CN) .......................... 201910907572.0

(51) Int. Cl.
*G06F 12/0811* (2016.01)
*G06F 12/0895* (2016.01)
(Continued)

(52) U.S. Cl.
CPC ...... *G06F 12/0811* (2013.01); *G06F 9/30047* (2013.01); *G06F 9/30101* (2013.01);
(Continued)

(58) Field of Classification Search
CPC ............. G06F 12/0811; G06F 9/30047; G06F 9/30101; G06F 12/0882; G06F 12/0895; G06F 12/1063; G06F 2212/1021
See application file for complete search history.

(56) References Cited

U.S. PATENT DOCUMENTS 5,860,147 A * 1/1999 Gochman ............. G06F 12/126
711/204
2007/0094476 A1* 4/2007 Augsburg ........... G06F 12/1027
711/207
(Continued)

*Primary Examiner* — Gurtej Bansal

(57) ABSTRACT

A storage management apparatus, a storage management method, a processor, and a computer system are disclosed. The storage management apparatus includes: at least one translation look-aside buffer, configured to store a plurality of cache entries, where the plurality of cache entries include a plurality of level 1 cache entries and a plurality of level 2 cache entries; and an address translation unit, coupled to the at least one translation look-aside buffer, and adapted to translate, based on one of the plurality of level 1 cache entries, a virtual address specified by a translation request into a corresponding translated address, or when the translation request does not hit any one of the plurality of level 1 cache entries, translate, based on one of the plurality of level 2 cache entries, a virtual address specified by the translation request into a corresponding translated address. In embodiments of the present disclosure, a hierarchical search is performed among the plurality of cache entries based on the virtual address specified by the translation request. Therefore, time required by searching for a cache entry in an address translation process is reduced, efficiency, frequency, and performance of a processor are improved, and power consumption is reduced.

21 Claims, 5 Drawing Sheets

(51) Int. Cl.
*G06F 12/0882* (2016.01)
*G06F 9/30* (2018.01)
*G06F 12/1045* (2016.01)

(52) U.S. Cl.
CPC ...... *G06F 12/0882* (2013.01); *G06F 12/0895* (2013.01); *G06F 12/1063* (2013.01); *G06F 2212/1021* (2013.01)

(56) References Cited

U.S. PATENT DOCUMENTS

| | | | |
|---|---|---|---|
| 2013/0227245 A1* | 8/2013 | Gupta | G06F 12/1027 711/205 |
| 2016/0125569 A1* | 5/2016 | Wakino | G06K 9/00973 382/305 |
| 2017/0220484 A1 | 8/2017 | Bradbury et al. | |
| 2019/0012266 A1 | 1/2019 | Brandt et al. | |
| 2020/0133881 A1* | 4/2020 | Campbell | G06F 12/0893 |

* cited by examiner

STORAGE MANAGEMENT APPARATUS, STORAGE MANAGEMENT METHOD, PROCESSOR, AND COMPUTER SYSTEM

CROSS-REFERENCE TO RELATED APPLICATIONS

This application claims priority to Chinese Patent Application No. 201910907572.0 filed Sep. 24, 2019, which is incorporated herein in its entirety.

TECHNICAL FIELD

The present invention relates to the processor field, and more specifically, to a storage management apparatus, a storage management method, a processor, and a computer system.

BACKGROUND OF THE INVENTION

In a computer system supporting a virtual storage mechanism, a virtual address (which may also be referred to as a valid address, a logical address, or VA for short) may be used to specify data, and a plurality of virtual addresses are used to manage a virtual storage space in the computer system. In a memory access process, a virtual address needs to be translated into a physical address (which may also be referred to as an actual address, a real address, or PA for short). To implement address translation, the computer system needs to store a large quantity of entries, where each entry is used to translate a virtual address in a specified range into a corresponding physical address.

To accelerate an address translation process, a translation look-aside buffer (TLB) may be used to temporarily store some entries stored in the computer system, to avoid that in each address translation process, a search needs to be performed among all the entries stored in the computer system. If a to-be-translated virtual address matches (which is referred to as hit or match) one of the entries temporarily stored in the TLB, the computer system may directly use the TLB to implement address translation, without performing an entry search outside the TLB.

For a high-performance processor, a program may dynamically access a very wide range of virtual addresses. To improve address translation efficiency as much as possible, a total quantity of cache entries stored in the TLB is increased continuously. Therefore, a range of addresses mapped in the TLB is expanded, and a TLB hit rate is increased. On the other hand, the high-performance processor also has a very high frequency requirement, and address translation is an operation process that occurs very frequently.

In a conventional solution, in an address translation process, a search generally needs to be performed among a plurality of cache entries one by one for a cache entry matching a to-be-translated virtual address. When a large quantity of cache entries are stored in the TLB, a long latency generated in the address translation process hinders the processor, and affects efficiency and performance of the processor. High power consumption is also generated in a process of searching for a cache entry matching a translation request among the plurality of cache entries.

SUMMARY OF THE INVENTION

In view of this, embodiments of the present invention provide a storage management apparatus, a storage management method, a processor, and a computer system to solve the foregoing problem.

To achieve this objective, according to a first aspect, the present invention provides a storage management apparatus, including: at least one translation look-aside buffer, configured to store a plurality of cache entries, where the plurality of cache entries include a plurality of level 1 cache entries and a plurality of level 2 cache entries; and an address translation unit, coupled to the at least one translation look-aside buffer, and adapted to translate, based on one of the plurality of level 1 cache entries, a virtual address specified by a translation request into a corresponding translated address, or when the translation request does not hit any one of the plurality of level 1 cache entries, translate, based on one of the plurality of level 2 cache entries, a virtual address specified by the translation request into a corresponding translated address.

In some embodiments, each cache entry is stored in a plurality of registers, and the plurality of registers include: a first register, configured to store a virtual address tag to indicate a virtual page mapped in the cache entry; and a second register, configured to store a translated address tag to indicate a translated page to which the virtual page is mapped, where page sizes of the virtual page and the translated page mapped in each cache entry are consistent.

In some embodiments, the storage management apparatus further includes a control unit, coupled to the address translation unit, and adapted to: when the virtual address specified by the translation request does not hit any one of virtual address tags in the plurality of cache entries, obtain, from a root page table, a to-be-refilled entry that matches the virtual address specified by the translation request; and write the to-be-refilled entry to the at least one translation look-aside buffer.

In some embodiments, the address translation unit is adapted to: determine whether the virtual address specified by the translation request hits one of the plurality of level 1 cache entries; and if one of the plurality of level 1 cache entries is hit, translate, based on the hit level 1 cache entry, the virtual address specified by the translation request into a corresponding translated address; or if none of the plurality of level 1 cache entries is hit, determine whether the virtual address specified by the translation request hits one of the plurality of level 2 cache entries; and if one of the plurality of level 2 cache entries is hit, translate, based on the hit level 2 cache entry, the virtual address specified by the translation request into a corresponding translated address; or if none of the plurality of level 2 cache entries is hit, provide mismatch information to the control unit, so that the control unit obtains the to-be-refilled entry.

In some embodiments, the control unit is further adapted to: when the plurality of level 1 cache entries are not hit and one of the plurality of level 2 cache entries is hit, select one of the plurality of level 1 cache entries based on a preset algorithm, and replace the selected one of the plurality of level 1 cache entries with the hit level 2 cache entry.

In some embodiments, the plurality of registers further include: a third register, configured to store a reference flag to indicate whether the cache entry is a least recently hit cache entry.

In some embodiments, when selecting the to-be-replaced plurality of level 1 cache entries based on the preset algorithm, the control unit is adapted to select a least recently hit level 1 cache entry based on the reference flag of each level 1 cache entry.

In some embodiments, when selecting the to-be-replaced plurality of level 1 cache entries based on the preset algorithm, the control unit is adapted to select a first written level 1 cache entry based on a sequence in which the plurality of level 1 cache entries are written to the at least one translation look-aside buffer.

In some embodiments, when the plurality of level 1 cache entries are not hit and one of the plurality of level 2 cache entries is hit, the control unit is further adapted to write the replaced level 1 cache entry as a level 2 cache entry to the at least one translation look-aside buffer.

In some embodiments, the plurality of registers further include: a fourth register, configured to store a size flag to indicate the page size of the virtual page or the translated page.

In some embodiments, when the plurality of level 1 cache entries are not hit and one of the plurality of level 2 cache entries is hit, the control unit is further adapted to select the to-be-replaced level 1 cache entry based on the size flag, so that page sizes to which the hit level 2 cache entry and the replaced level 1 cache entry are mapped are equal.

In some embodiments, in the at least one translation look-aside buffer, a quantity of the level 1 cache entries is less than or equal to a quantity of the level 2 cache entries.

According to a second aspect, the present invention provides a processor, including the storage management apparatus according to any one of the foregoing embodiments.

In some embodiments, the processor further includes an instruction pre-fetch unit, where the instruction pre-fetch unit provides the translation request to the address translation unit, where the translation request specifies a virtual address of a pre-fetch instruction; and the address translation unit communicates with a first translation look-aside buffer in the at least one translation look-aside buffer, and provides a translated address of the pre-fetch instruction to the instruction pre-fetch unit based on the cache entry provided by the first translation look-aside buffer.

In some embodiments, the processor further includes a load/store unit, where the load/store unit provides the translation request to the address translation unit, where the translation request specifies a virtual address of a memory access instruction; and the address translation unit communicates with a second translation look-aside buffer in the at least one translation look-aside buffer, and provides a translated address of the memory access instruction to the load/store unit based on the cache entry provided by the second translation look-aside buffer.

According to a third aspect, the present invention provides a computer system, including: the processor according to any one of the foregoing embodiments; and a memory, coupled to the processor.

According to a fourth aspect, the present invention provides a storage management method, including: providing a plurality of cache entries, where the plurality of cache entries include a plurality of level 1 cache entries and a plurality of level 2 cache entries; receiving a translation request, where the translation request specifies a to-be-translated virtual address; and translating, based on one of the plurality of level 1 cache entries, the virtual address specified by the translation request into a corresponding translated address, or when the translation request does not hit any one of the plurality of level 1 cache entries, translating, based on one of the plurality of level 2 cache entries, the virtual address specified by the translation request into a corresponding translated address.

In some embodiments, each cache entry is stored in a plurality of registers, and the plurality of registers include: a first register, configured to store a virtual address tag to indicate a virtual page mapped in the cache entry; and a second register, configured to store a translated address tag to indicate a translated page to which the virtual page is mapped, where page sizes of the virtual page and the translated page mapped in each cache entry are consistent.

In some embodiments, the storage management method further includes: when the virtual address specified by the translation request does not hit any one of virtual address tags in the plurality of cache entries, obtaining, from a root page table, a to-be-refilled entry that matches the virtual address specified by the translation request; and writing the to-be-refilled entry as a level 1 cache entry or a level 2 cache entry to at least one translation look-aside buffer configured to store the plurality of cache entries.

In some embodiments, the step of translating, based on one of the plurality of cache entries, the virtual address specified by the translation request into a corresponding translated address includes: determining whether the virtual address specified by the translation request hits one of the plurality of level 1 cache entries; and if one of the plurality of level 1 cache entries is hit, translating, based on the hit level 1 cache entry, the virtual address specified by the translation request into a corresponding translated address; or if none of the plurality of level 1 cache entries is hit, determining whether the virtual address specified by the translation request hits one of the plurality of level 2 cache entries; and if one of the plurality of level 2 cache entries is hit, translating, based on the hit level 2 cache entry, the virtual address specified by the translation request into a corresponding translated address; or if none of the plurality of level 2 cache entries is hit, providing mismatch information to the control unit, so that the control unit obtains the to-be-refilled entry.

In some embodiments, the storage management method further includes: when the plurality of level 1 cache entries are not hit and one of the plurality of level 2 cache entries is hit, selecting one of the plurality of level 1 cache entries based on a preset algorithm, and replacing the selected one of the plurality of level 1 cache entries with the hit level 2 cache entry.

In some embodiments, the plurality of registers further include: a third register, configured to store a reference flag to indicate whether the cache entry is a least recently hit cache entry.

In some embodiments, when the to-be-replaced plurality of level 1 cache entries are selected based on the preset algorithm, the preset algorithm selects a least recently hit level 1 cache entry based on the reference flag of each level 1 cache entry.

In some embodiments, when the to-be-replaced plurality of level 1 cache entries are selected based on the preset algorithm, the preset algorithm selects a first written level 1 cache entry based on a sequence in which the plurality of level 1 cache entries are written to the at least one translation look-aside buffer.

In some embodiments, the storage management method further includes: when the plurality of level 1 cache entries are not hit and one of the plurality of level 2 cache entries is hit, writing the replaced level 1 cache entry as a level 2 cache entry to the at least one translation look-aside buffer.

In some embodiments, the plurality of registers further include: a fourth register, configured to store a size flag to indicate the page size of the virtual page or the translated page.

In some embodiments, when the plurality of level 1 cache entries are not hit and one of the plurality of level 2 cache entries is hit, the preset algorithm selects the to-be-replaced level 1 cache entry based on the size flag, so that page sizes to which the hit level 2 cache entry and the replaced level 1 cache entry are mapped are equal.

In some embodiments, a quantity of the level 1 cache entries is less than or equal to a quantity of the level 2 cache entries.

In comparison with a conventional solution, the storage management method and storage management apparatus provided by the embodiments of the present invention perform a hierarchical search among the plurality of cache entries based on the virtual address specified by the translation request. Because a total quantity of the level 1 cache entries is less than a total quantity of the cache entries provided by the storage management apparatus, if a level 1 cache entry can be hit, a quantity of cache entries that need to be matched and compared with the virtual address specified by the translation request may be reduced obviously. Therefore, time required by searching for the cache entry in an address translation process is reduced, efficiency, frequency, and performance of the processor are improved, and power consumption generated in the address translation process is reduced.

In some preferred embodiments, if none of the level 1 cache entries is hit and a level 2 cache entry is hit, a level 1 cache entry that is used infrequently may be replaced with the hit level 2 cache entry. This further increases a hit rate of the plurality of level 1 cache entries, and further reduces time required by searching for the cache entry in the address translation process.

BRIEF DESCRIPTION OF THE DRAWINGS

The embodiments of the present invention are described with reference to the accompanying drawings hereinafter, and the description will make the foregoing and other objectives, features, and advantages of the present invention clearer. In the drawings.

DETAILED DESCRIPTION OF THE INVENTION

Figure 1:
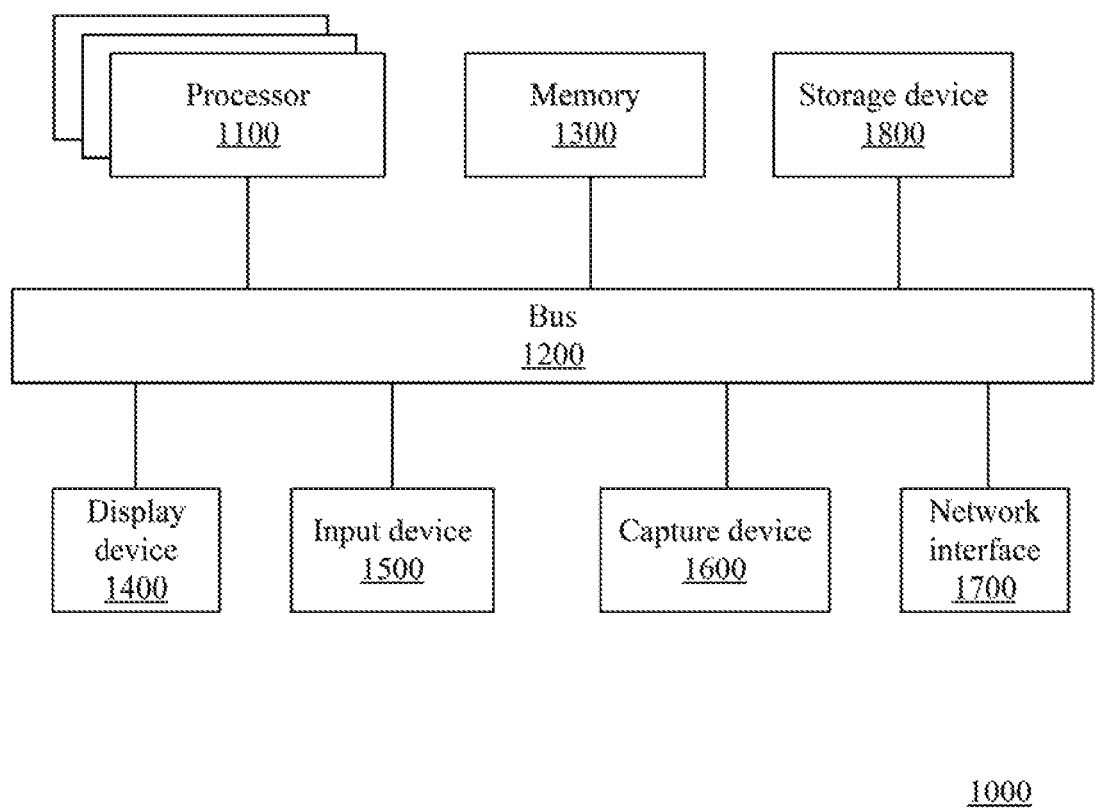
FIG. 1 illustrates a schematic block diagram of a system according to an embodiment of the present invention.

The following describes the present invention based on the embodiments, but the present invention is not limited to the embodiments. In the following detailed description of the present invention, some specific detailed parts are described exhaustively. Those skilled in the art can fully understand the present invention without descriptions of the detailed parts. To avoid confusion of the essence of the present invention, well-known methods, processes, and procedures are not described in detail. In addition, the figures are not necessarily drawn in proportion.

The following terms are used in this specification.

Computer system: It is a general embedded system, a desktop computer, a server, or another system having an information processing capability.

Memory: It is located in the computer system, and is a physical structure for storing information. Based on different purposes, memories may be classified into a primary memory (which may also be referred to as an internal memory, or referred to as a memory for short) and a secondary memory (which may also be referred to as an external memory). The primary memory is configured to store instruction information and/or data information indicated by a data signal, for example, configured to store data provided by a processor, or may be configured to implement information exchange between a processor and an external memory. Information provided by the external memory needs to be invoked into the primary memory before the information can be accessed by the processor. Therefore, a memory mentioned in this specification is generally a primary memory, and a storage device mentioned in this specification is generally an external memory.

Physical address (Physical Address, PA for short): It is an address on an address bus. The processor or other hardware may provide a physical address to the address bus to access the primary memory. The physical address may also be referred to as an actual address, a real address, or an absolute address.

Virtual address: It is an abstract address used by software or a program. A virtual address space may be greater than a physical address space, and a virtual address may be mapped to a corresponding physical address.

Paging (paging) management mechanism: The virtual address space is divided into a plurality of parts, where each part is used as a virtual page. In addition, the physical address space is divided into a plurality of parts, where each part is used as a physical page. The physical page is also referred to as a physical address block or a physical address page frame (page frame).

Root page table: It is used to specify a correspondence between a virtual page and a physical page, and generally stored in the primary memory. The root page table includes a plurality of entries, where each entry is used to specify a mapping relationship between a virtual page and a physical page and some management flags, so that a virtual address in a virtual page can be translated into a physical address in a corresponding physical page.

Cache entry: Some entries that may be frequently used in the root page table may be temporarily stored in a translation look-aside buffer, so that the entries are invoked in an address translation process, to accelerate the address translation process. To distinguish from an entry in the root page table, an entry stored in the TLB is hereinafter referred to as a cache entry for short.

The embodiments of this application may be applied to a system such as the Internet and the Internet of Things (IoT for short), for example, a 5G mobile Internet system, or an automated driving system. However, it should be appreciated that the embodiments of the present invention are not limited thereto, and may be further applied to any scenario in which address translation needs to be implemented.

System Overview

FIG. 1 illustrates a schematic block diagram of a computer system according to an embodiment of the present invention. The computer system 1000 shown in FIG. 1 is intended to show at least some components of one or more electronic apparatuses. In other embodiments of the present invention, some components shown in FIG. 1 may be omitted or connections between components may be implemented in different architectures, or some hardware and/or software modules not shown in FIG. 1 may be included. Two or more components shown in FIG. 1 may also be combined into one component in a software architecture and/or a hardware architecture.

In some embodiments, the computer system 1000 may be applied to a mobile device, a handheld device, or an embedded device, for example, applied to a smartphone using a 5G technology or a processing platform of a self-driving vehicle. The computer system 1000 may be further applied to an Internet of Things device, a wearable device (for example, a device such as a smart watch or smart glasses), or may be a device such as a TV set or a set top box.

As shown in FIG. 1, the computer system 1000 may include one or more processors 1100. For example, the computer system 1000 may be a terminal system including at least one processor, a workstation system including a plurality of processors, or a server system including a large quantity of processors or processor cores. One or more processors 1100 in the computer system 1000 may be chips that are packaged separately, or may be integrated circuits that are integrated in a system-on-chip (System of Chip, SoC). The processor 1100 may be a central processing unit, a graphics processing unit, a physical processor, or the like.

As shown in FIG. 1, the computer system 1000 further includes a bus 1200, and the processor 1100 may be coupled to one or more buses 1200. The bus 1200 is configured to transmit a signal between the processor 1100 and other components of the computer system 1000, for example, transmit an address, data, or a control signal. The bus 1200 may be a processor bus, for example, a direct media interface (DMI) bus. However, the interface bus 1200 in this embodiment of the present invention is not limited to using the DMI bus as an interface bus, and may further include one or more interconnect buses, for example, a bus based on a peripheral component interconnect (Peripheral Component Interconnect, PCI) standard, a memory bus, or a bus of another type.

In some embodiments, as shown in FIG. 1, the computer system 1000 further includes a memory 1300. The memory 1300, as a primary memory of the computer system, may be a dynamic random access memory (DRAM), a static random access memory (SRAM), or another module having a storage capability. In some embodiments, the memory 1300 may be configured to store data information and instruction information for use by one or more processors 1100 during execution of an application program or a process. In addition, the computer system 1000 may further include one or more storage devices 1800, used as secondary memories to provide an additional storage space.

The computer system 1000 may also be coupled, by using the bus 1200, to a display device 1400, for example, a cathode ray tube (CRT), a liquid crystal display (LCD), or an organic light-emitting diode (OLED) array, to display information that a user needs to learn.

In some embodiments, the computer system 1000 may include an input device 1500, for example, a device such as a keyboard, a mouse, or a touch panel, configured to transmit information corresponding to a user operation to a corresponding processor 1100 through the bus 1200. The computer system 1000 may further include a capture device 1600, which may be coupled to the bus 1200 to transmit an instruction and data related to information that may be captured, such as an image/voice. The capture device 1600 is, for example, a device such as a microphone and/or a video camera or a camera for capturing images. Data provided by the input device 1500 and the capture device 1600 may be stored in a corresponding storage area of the storage device 1300, and instructions provided by the input device 1500 and the capture device 1600 may be executed by a corresponding processor 1100.

The computer system 1000 may further include a network interface 1700, so that the system can access a network. The network is, for example, a local area network (LAN), a wide area network (WAN), a metropolitan area network (MAN), a personal area network (PAN), Bluetooth, a cloud network, a mobile network (for example, a long term evolution (Long Term Evolution, LTE) network, a 3G network, a 4G network, or a 5G network), an intranet, or the Internet. The network interface 1700 may include a wireless network interface that has at least one antenna and/or a wired network interface that communicates by using a network cable, where the network cable may be an Ethernet cable, a coaxial cable, an optical fiber, a serial cable, or a parallel cable.

For example, the network interface 1700 may provide, based on the IEEE 802.11b and/or 802.11g standard, access to the LAN, or may provide, based on the Bluetooth standard, access to a personal local area network, or may support other wireless network interfaces and/or protocols, including existing communication standards and future communication standards. The network interface 1700 may further use the time division multiple access (TDMI) protocol, the global system for mobile communications (GSM) protocol, the code division multiple access (CDMA) protocol, and/or wireless communication protocols of other types, or the like.

It should be noted that, the foregoing description and FIG. 1 are used merely for describing the computer system 1000 exemplarily, but not used for limiting a specific implementation of the computer system 1000. The computer system 1000 may further include other components, for example, a data processing unit. Each component in the computer system 1000 in the foregoing description may also be omitted properly in an actual application.

Processor

Figure 2:
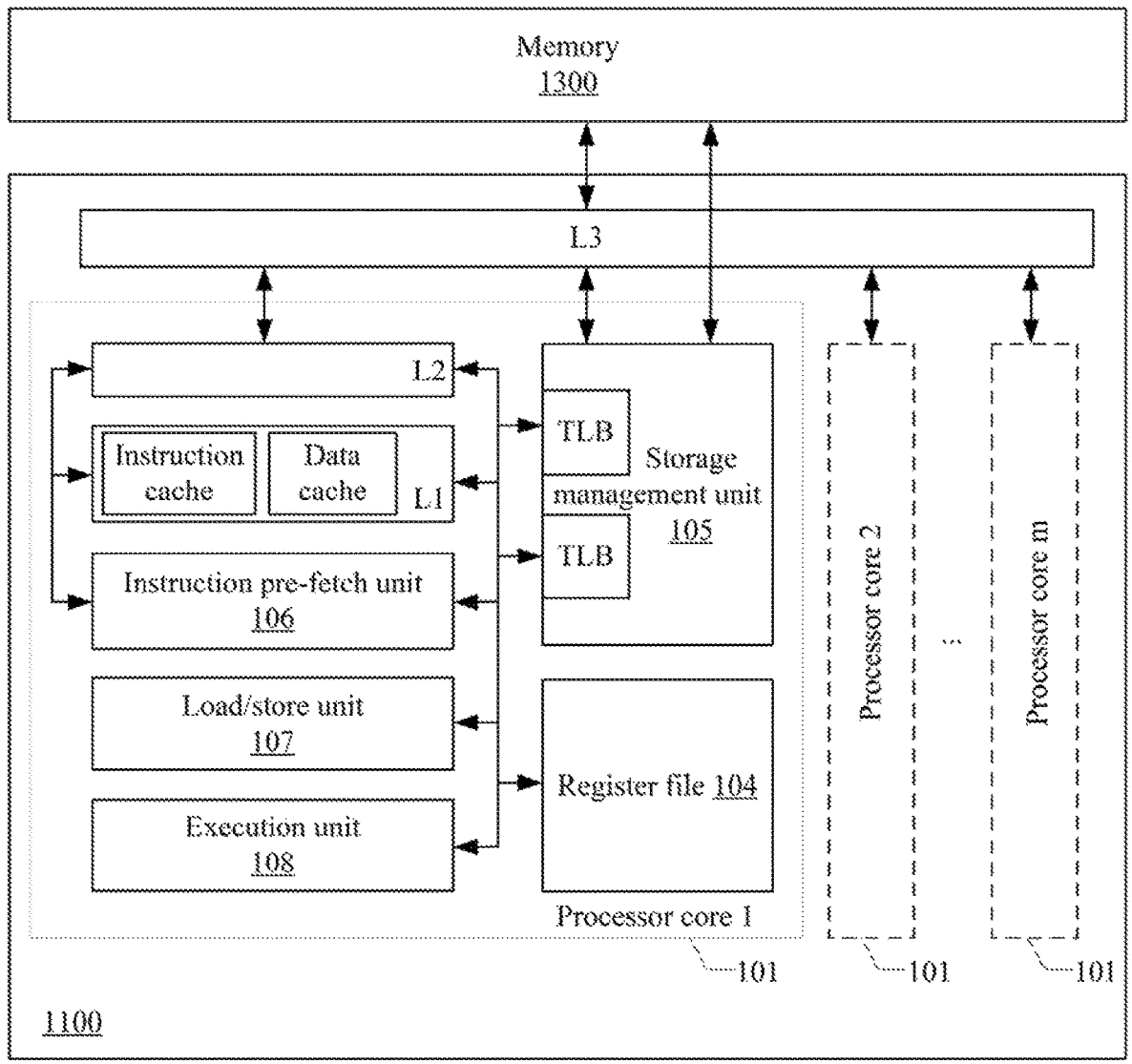
FIG. 2 is a schematic block diagram of a processor 1100 according to an embodiment of the present invention.

FIG. 2 is a schematic block diagram of the processor 1100 according to an embodiment of the present invention. In some embodiments, each processor 1100 may include one or more processor cores 101 configured to process instructions, where instruction processing and execution may be controlled by a user (for example, by using an application program) and/or a system platform. In some embodiments, each processor core may be configured to process a specific instruction set. In some embodiments, an instruction set may support complex instruction set computing (CISC), reduced instruction set computing (RISC), or very long instruction word (VLIW)-based computing. Different processor cores 101 may process different instruction sets. In some embodiments, the processor core 101 may further include other processing modules, for example, a digital signal processor (DSP). As an example, FIG. 2 illustrates processor cores 1 to m, where m is a non-zero natural number.

In some embodiments, as shown in FIG. 2, the processor 1100 may include a cache. In addition, based on different architectures, the cache in the processor 1100 may be a single internal cache or multi-level internal caches (for example, three-level caches L1 to L3 shown in FIG. 2) located in and/or outside each processor core 101, or may include an instruction-oriented instruction cache and a data-oriented data cache. In some embodiments, each component of the processor 1100 may share at least one part of the cache. For example, as shown in FIG. 2, the processor cores 1 to m share the level 3 cache L3. The processor 1100 may further include an external cache (not illustrated). Alternatively, another cache structure may be used as an external cache of the processor 1100.

In some embodiments, as shown in FIG. 2, the processor 1100 may include a register file 104 (RegisterFile). The register file 104 may include a plurality of registers configured to store different types of data and/or instructions, and the registers may be of different types. For example, the register file 104 may include an integer register, a floating-point register, a status register, an instruction register, and a pointer register. The registers in the register file 104 may be implemented by using general registers, or may be particularly designed based on an actual requirement of the processor 1100.

The processor 1100 may include a storage management unit (MMU) 105. The storage management unit 105 stores a plurality of cache entries, for translating virtual addresses into physical addresses. One or more storage management units 105 may be disposed in each processor core 101. Storage management units 105 in different processor cores 101 may also implement synchronization with storage management units 105 located in other processors or processor cores, so that each processor or processor core can share a unified virtual storage system.

In some embodiments, an internal interconnect structure is used to perform interaction between the storage management unit 105 and other processor cores through an internal bus of the system-on-chip, or is directly connected to another module in the system-on-chip to implement signal exchange.

The storage management unit 105 may communicate with an instruction pre-fetch unit 106 configured to prefetch an instruction and/or a load/store unit (Load/Store Unit, LSU) 107 configured to load or store data, in the processor 1100.

The instruction pre-fetch unit 106 accesses the storage management unit 105 by using a virtual address of a pre-fetch instruction, so that the virtual address is translated into a physical address of the pre-fetch instruction. In addition, the instruction pre-fetch unit 106 performs addressing in a physical address space based on the physical address generated through translation by the storage management unit 105, to obtain a corresponding instruction. An execution unit in the processor core 101 may receive the instruction obtained by the instruction pre-fetch unit 106, and perform processing (such as decoding) on the instruction, so that the instruction can be executed.

The load/store unit 107 is an instruction execution unit oriented to a memory access instruction (load instruction or storage instruction). The load/store unit 107 may be configured to obtain data information in the cache and/or the memory 1300 based on the load instruction, and load the data information to a corresponding register in the processor 1100. The load/store unit 107 may store data information in a corresponding register to the cache and/or the memory 1300 based on the storage instruction. The registers include, for example, an address register, a stepping register, and an address mask register in the register file 104. The load/store unit 107 accesses the storage management unit 105 based on a virtual address of the memory access instruction. The storage management unit 105 provides a physical address of the memory access instruction that is obtained after translation to the load/store unit 107, so that the load/store unit 107 can access corresponding data in the physical address space based on the physical address.

It should be noted that, the foregoing description and FIG. 2 are used merely for describing one of the processors in the system exemplarily, but not used for limiting a specific implementation of the processor 1100. The processor 1100 may further include other components, for example, a data processing unit. Each component in the processor 1100 in the foregoing description may also be omitted properly in an actual application.

Storage Management Unit

The storage management unit 105 may also be referred to as a memory management unit in some cases, and may be a storage management apparatus implemented by hardware and/or software.

To better manage an address space exclusively occupied by each process, the computer system 1000 may allocate independent virtual address spaces to some processes, and provide mapping relationships between virtual addresses and physical addresses, to map or demap a virtual address space to a physical address space. As described above, because transmission of data in the computer system 1000 is generally performed in units of pages, the computer system and/or an operating system running on the computer system generally manage/manages the physical address space and the virtual address space in units of pages. The virtual address space may be greater than the physical address space. To be specific, a virtual page in the virtual address space may be mapped to a physical page in the physical address space, or may be mapped to a swap file, or may have no mapped content.

Based on the foregoing paging management mechanism, a mapping relationship between each virtual page in the virtual address space and each physical page in the physical address space may be stored as a root page table in the primary memory. The root page table generally includes many entries (entry), where each entry is used to provide a mapping relationship between a virtual page and a corresponding physical page, so that a virtual address in a virtual page matching the entry can be translated into a corresponding physical address based on the entry.

For a process, a virtual address range (which may be referred to as a page size of a virtual page) corresponding to each virtual page should be consistent with a page size of a corresponding physical page, for example, is but is not limited to 4 KB (kilobytes), 8 KB, 16 KB, or 64 KB. It should be additionally noted that, for different processes, page sizes of corresponding virtual pages may be consistent or inconsistent; likewise, for different processes, page sizes of corresponding physical pages may be consistent or inconsistent. Different selections are available in different embodiments.

If the TLB is not disposed, after receiving a translation request, the storage management unit needs to access the memory (for example, the RAM in the storage device 1300) at least two times: query a root page table stored in the memory, to obtain an entry matching the translation request (memory access for the first time), and then translate a virtual address specified by the translation request into a corresponding physical address based on the entry; and read an instruction and/or data from the memory based on the physical address (memory access for the second time). A plurality of times of memory access cause performance of the processor to deteriorate.

To reduce the quantity of times of memory access by the storage management unit and accelerate the address translation process, as shown in FIG. 2, at least one translation look-aside buffer TLB (also referred to as a fast table, a page table buffer, or the like) is disposed in the storage management unit 105 in this embodiment of the present disclosure, and is configured to replicate an entry that may be accessed from the memory to the TLB, and store the entry as a cache entry, to cache a frequently used mapping relationship between a virtual page and a physical page. The storage management unit 105 accesses the root page table in the memory to obtain a corresponding entry only when no cache entry matching the virtual address specified by the translation request can be found in the TLB. When a cache entry matching the virtual address specified by the translation request exists in the TLB, the storage management unit 105 can complete address translation without accessing the root page table. Therefore, the TLB can reduce the quantity of times of memory access by the storage management unit. This saves time required for address translation, and improves performance of the processor.

Figure 3:
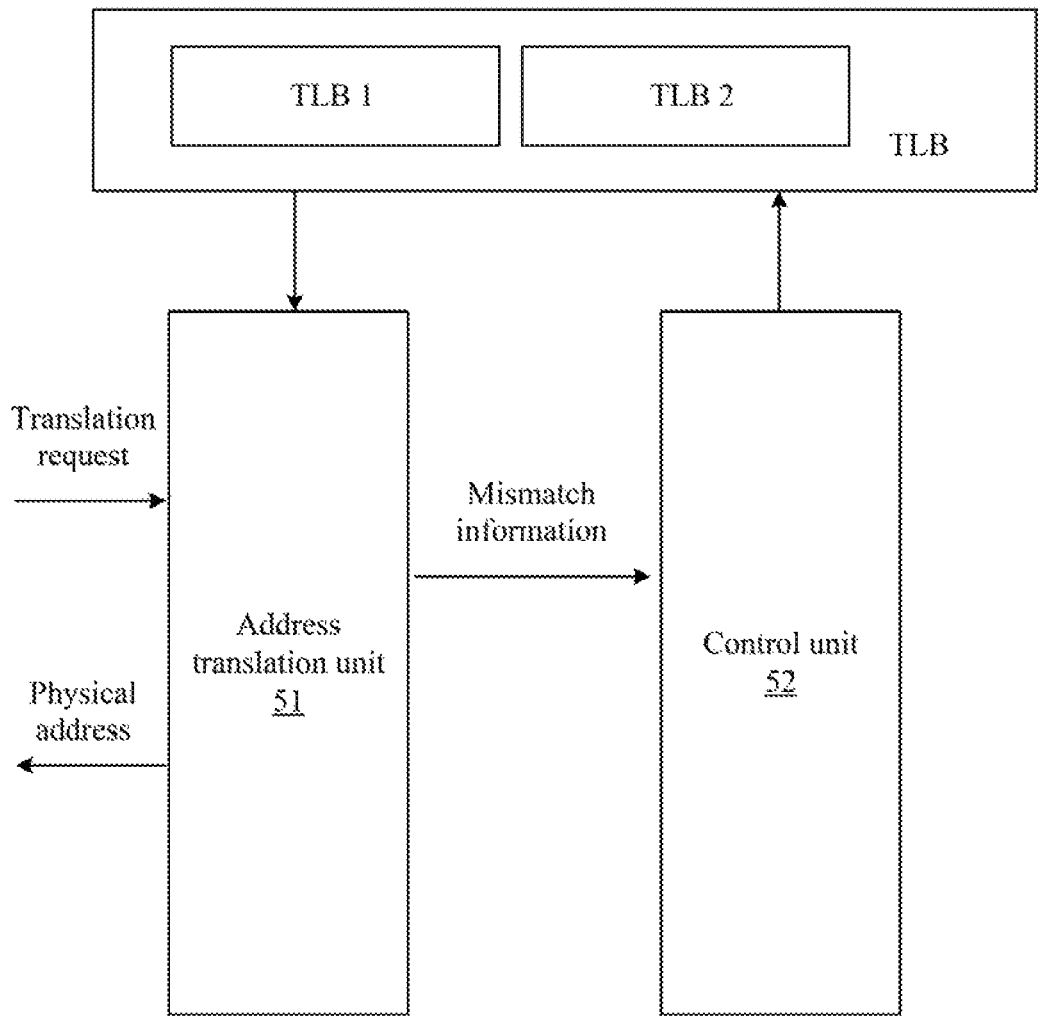
FIG. 3 illustrates a schematic block diagram of a storage management unit according to an embodiment of the present invention.

FIG. 3 illustrates a schematic block diagram of the storage management unit according to an embodiment of the present invention.

For different processing objects, the storage management unit 105 may be independently disposed as an instruction storage management unit for managing instruction storage, and/or a data storage management unit for managing data storage. The storage management unit 105 may also manage storage of instructions and data in a unified manner.

In some embodiments, as shown in FIG. 3, an instruction TLB and a data TLB may be disposed in the storage management unit 105, where the instruction TLB is configured to temporarily store an instruction cache entry corresponding to an instruction read/write address, and the data TLB is configured to temporarily store a data cache entry corresponding to a data read/write address. For example, the instruction TLBs configured to receive a translation request sent by the instruction pre-fetch unit 106, and return a corresponding physical address to the instruction pre-fetch unit 106. For example, the data TLB is configured to receive a translation request sent by the load/store unit 107, and return a corresponding physical address to the load/store unit 107.

In this embodiment of the present disclosure, the storage management unit 105 includes multi-level TLBs. As described above, the multi-level TLBs may be multi-level instruction TLBs disposed in the instruction storage management unit and configured to translate instruction addresses, or may be multi-level data TLBs disposed in the data storage management unit and configured to translate data addresses, or may be multi-level TLBs in the storage management unit that manages storage of instructions and data in a unified manner. In some embodiments, the storage management unit 105 may further include other TLBs disposed independently of the multi-level TLBs.

As an example, as shown in FIG. 3, the storage management unit 105 includes a level 1 translation look-aside buffer TLB 1, and a level 2 translation look-aside buffer TLB 2. The level 1 translation look-aside buffer TLB 1 stores m1 level 1 cache entries, and the level 2 translation look-aside buffer TLB 2 stores m2 level 2 cache entries, so that a total quantity of cache entries that the storage management unit 105 can provide is equal to m_all=m1+m2, where m1 and m2 are both natural numbers greater than or equal to 1, and m_all is a natural number greater than or equal to 2. In some preferred embodiments, m1 is less than or equal to m2, and each level 1 cache entry is different from each level 2 cache entry.

The following mainly describes embodiments of the present invention by using two-level TLBs as an example. However, this embodiment of the present invention is not limited thereto, and at least three-level TLBs may be further disposed in the storage management unit 105 based on the example of the two-level TLBs provided by this embodiment of the present disclosure.

As shown in FIG. 3, the storage management unit 105 may further include an address translation unit 51 and a control unit 52. The address translation unit 51 is configured to search the multi-level TLBs for a corresponding cache entry based on a translation request, and translate, based on the cache entry, a virtual address specified by the translation request into a physical address; when the address translation unit 51 does not find a cache entry matching the to-be-translated virtual address from the multi-level TLBs, the address translation unit 51 may transmit mismatch information to the control unit 52, and the control unit 52 obtains a matched to-be-refilled entry from the root page table based on the mismatch information; and then the address translation unit 51 may translate the to-be-translated virtual address into a physical address based on the matched cache entry.

In this embodiment of the present disclosure, the control unit 52 is further configured to: when a plurality of level 1 cache entries are not hit and one of a plurality of level 2 cache entries is hit, select one of the plurality of level 1 cache entries based on a preset algorithm, and replace the one of the plurality of level 1 cache entries that is selected based on the preset algorithm with the hit level 2 cache entry.

It should be noted that, the foregoing description and FIG. 3 are used merely for describing one of the storage management units in the computer system exemplarily, but not used for limiting a specific implementation of the storage management unit 105. The storage management unit 105 may further include other components. Each component in the storage management unit 105 in the foregoing description may also be omitted properly in an actual application.

Translation Look-Aside Buffer

In this embodiment of the present invention, a translation look-aside buffer TLB on each level may include a hardware component and/or a software program, for example, implemented by a plurality of registers. Each cache entry may be independently stored in a corresponding register, and the TLB on each level may further include a register for storing an instruction such as a read instruction or a write instruction. Because the total quantity m_all of cache entries stored in the storage management unit 105 is limited by hardware resources, the total quantity m_all of cache entries in the storage management unit 105 represents a quantity of potential requests in an address translation process that the processor may implement by using the TLB without a performance loss. To be specific, if the total quantity m_all of cache entries is larger, an address translation capability of the storage management unit 105 is stronger. Therefore, as described above, it is expected that the total quantity m_all of cache entries temporarily stored in the storage management unit 105 should be increased as much as possible.

In this embodiment, a mapping mode between a virtual address and a cache entry is described by using a full associative (Full Associative) mode as an example. To be specific, any entry in the root page table may be mapped in a TLB entry, without being limited by a specified bit in a virtual address or a physical address. However, this embodiment of the present invention is not limited thereto. In other embodiments, the mapping mode between the virtual address and the TLB entry may be: a direct mapping mode, a set associative (Set Associative) mode, or another mapping mode.

Figure 4:
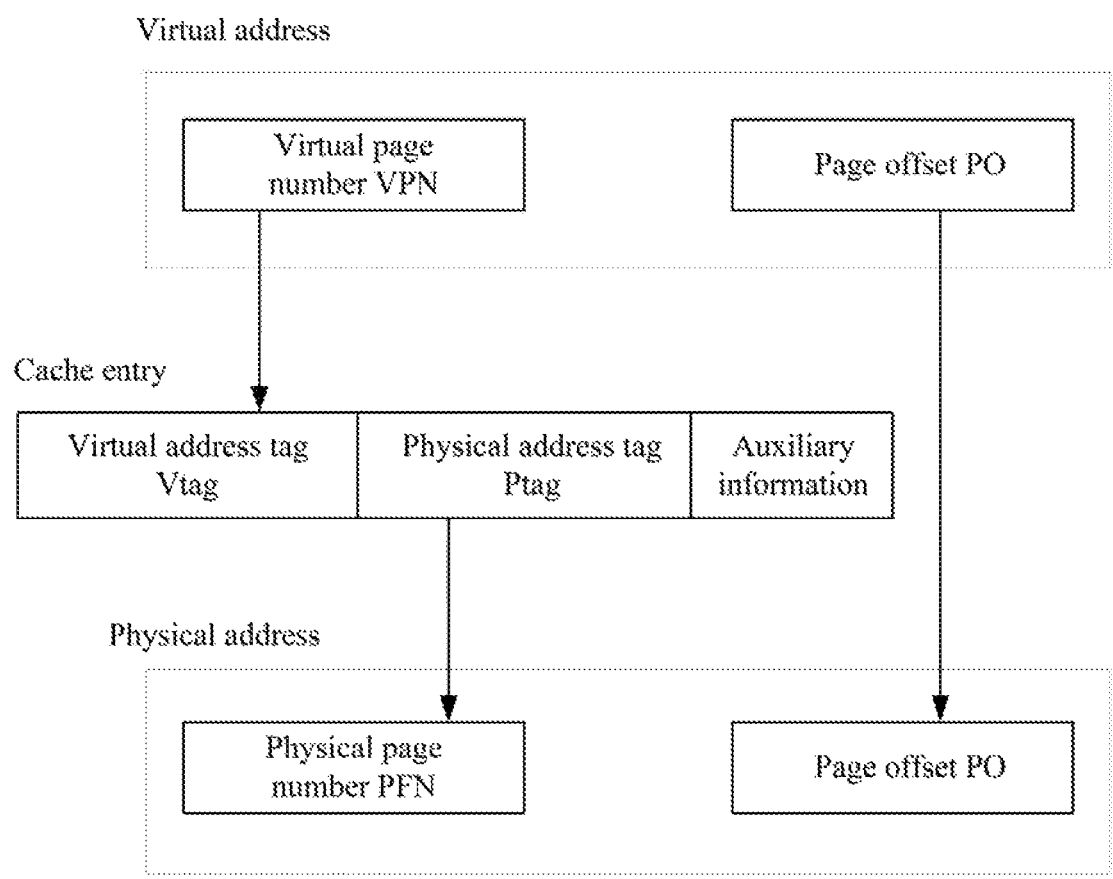
FIG. 4 illustrates a schematic diagram of address translation implemented by using a TLB.

FIG. 4 illustrates a schematic diagram of address translation implemented by using a TLB. Using a 32-bit address (which may be a virtual address or a physical address) and each intra-page address corresponding to 1B (Byte, byte) in a page (which may be a virtual page or a physical page) as an example: if a page size is 4 KB, an intra-page offset PO_4k of each address A[31:0] in the page is equal to A[11:0], and a page number PN_4k is equal to A[31:12]; or if a page size is 8 KB, an intra-page offset PO_8k of each address A[31:0] in the page is equal to A[12:0], and a page number PN_8k is equal to A[31:13]. Because a mapping between a virtual address and a physical address may be a mapping between pages, and a page size of a virtual page is consistent with a page size of a physical page to which the virtual page is mapped, the virtual address and the physical address to which the virtual address is mapped have a same intra-page offset. The following uses this as an example to describe a process of implementing address translation by using the TLB in this embodiment of the present invention. However, it should be noted that, this embodiment of the present invention is not limited thereto. The virtual page or physical page may have any other page size (for example, 64 KB or 32 KB), and the virtual address or physical address may be in another format (for example, 64 bits or 128 bits). In addition, in some other embodiments, page numbers included in virtual addresses (or physical addresses), and settings and division modes of high and low positions of intra-page offsets may be different.

As shown in FIG. 4, a virtual address specified by a translation request may be translated into a corresponding physical address by using a cache entry matching the virtual address. A data structure of each cache entry (including a level 1 cache entry and a level 2 cache entry) may include: a virtual address tag Vtag, a physical address tag Ptag, auxiliary information, and the like.

The virtual address tag Vtag is used to determine whether the cache entry matches the to-be-translated virtual address. As can be known from the foregoing analysis, a virtual page number may be used to identify a virtual page. Therefore, the virtual address tag Vtag of the cache entry and a virtual page number VPN of the virtual page mapped in the cache entry may be set to consistent binary codes, and the physical address tag of the cache entry and a physical page number PFN of the physical page mapped in the cache entry may be set to consistent binary codes. When a virtual page number VPN of the to-be-translated virtual address is consistent with the virtual address tag Vtag of the cache entry, it indicates that the cache entry is hit. In this case, because the virtual address and the physical address to which the virtual address is mapped have a same intra-page offset PO, the physical address tag Ptag (used for replacing the virtual page number of the virtual address) provided by the hit cache entry and the intra-page offset PO of the to-be-translated virtual address may be combined into the physical address to which the to-be-translated virtual address is mapped, to complete translation.

For each cache entry, a page size of the virtual page mapped in the cache entry is equal to a page size of the physical page mapped in the cache entry. Therefore, the page size of the virtual page mapped in the cache entry and the page size of the physical page mapped in the cache entry are collectively referred to as a page size to which the cache entry is mapped.

To indicate a page size to which each cache entry is mapped, auxiliary information of the cache entry may include a size flag, where the size flag may be a one-bit or multi-bit binary code. In some embodiments, each cache entry may be mapped to a 4 KB or 8 KB page. In this case, a size flag of a cache entry that is mapped to the 4 KB page size may be set to 0, and a size flag of a cache entry that is mapped to the 8 KB page size may be set to 1. When a page size to which a cache entry is mapped is extended from 4 KB to 8 KB, a size flag of the cache entry may be updated from 0 to 1. It should be noted that, this embodiment of the present invention is not limited thereto. The cache entry may also be mapped to any other page size. To be specific, each cache entry in the TLB may be mapped to one of a plurality of page sizes, and a quantity of bits of the size flag S may also be set based on a type of a page size.

After the translation request is received, comparison may be made between the virtual page number VPN of the to-be-translated virtual address and the virtual address tag Vtag of each cache entry, to search for a matched cache entry. The size flag may be used to indicate a quantity of valid bits of the virtual address tag (namely, bits used for comparison with the virtual address in a search process). For example, a 4 KB virtual page VP1_4k is mapped in a cache entry E1. Assuming that a size flag S1 of the cache entry E1 is 0, it indicates that a quantity of bits of a virtual address tag Vtag1 included in the cache entry is 20. Comparison may be made between the 20 bits and a 20-bit virtual page number of a to-be-translated virtual address to determine whether they match. An 8 KB virtual page VP2_8k is mapped in a cache entry E2 shown in FIG. 5. Assuming that a size flag S2 of the cache entry E2 is 1, it indicates that a quantity of bits of a virtual address tag Vtag2 included in the cache entry is 19. Comparison may be made between the 19 bits and a 19-bit virtual page number of a to-be-translated virtual address to determine whether they match.

The auxiliary information of each cache entry may include a validity bit, used to indicate a status of each cache entry. In some scenarios, for example, after an operation of process switching or updating a root page table is performed, a translation relationship provided by the cache entry may not be applicable to a current situation any longer. In this case, a corresponding validity bit of the cache entry may indicate a failed state (for example, an invalid level or 0). It indicates that the cache entry cannot be used in a current address translation process, and may be replaced or covered. When the validity bit of the cache entry indicates a valid state (for example, a valid level or 1), it indicates that the cache entry may be used to indicate whether the cache entry can be used in the current translation process. In some embodiments, when a free storage space available for storing a cache entry still exists in multi-level TLBs, the free storage space may also be equivalent to a cache entry in the failed state, where a validity bit of the cache entry indicates the failed state, and is used to indicate that the free storage space may be used to write a new cache entry.

It should be noted that, in subsequent descriptions, all hit cache entries are cache entries in the valid state.

In some embodiments, when the translation request does not hit any one of cache entries in the storage management unit 105, and the quantity of cache entries stored in the storage management unit 105 has reached an upper limit m_all, one of the cache entries needs to be replaced. In this case, a cache entry that may be replaced may be selected based on a frequency of using each cache entry. For example, an LRU (Least Recently Used) algorithm is used to replace a cache entry that is least recently used. To indicate the use frequency, the auxiliary information of the cache entry may include a reference flag, where the reference flag may be a 1-bit or multi-bit binary code. When a cache entry is used for translation, a reference flag of the cache entry may be updated to indicate a higher use frequency (or a reference flag of another cache entry is updated to indicate a lower use frequency). Therefore, during execution of the LRU algorithm, a cache entry that may be replaced may be selected based on the reference flag of each cache entry.

In some embodiments, the auxiliary information of the cache entry may further include a dirty bit, used to indicate whether an address space in the memory is modified. The dirty bit may also be a 1-bit or multi-bit binary code.

In some embodiments, the auxiliary information of the cache entry may further include another indication bit, for example, used to indicate a process flag number associated with a page, a read/write permission of the page, and page address attributes.

It should be noted that, although the virtual address tag, the physical address tag, and the auxiliary information of each cache entry are arranged in descending order of bits in the foregoing descriptions and the description of FIG. 4, this embodiment of the present invention is not limited thereto. The virtual address tag, the physical address tag, and the auxiliary information of each cache entry such as the size flag and the validity bit may be arranged in different orders. For example, the size flag may be located in a highest bit of the cache entry to facilitate identification of the page size corresponding to the cache entry.

Address Translation Process

Figure 5:
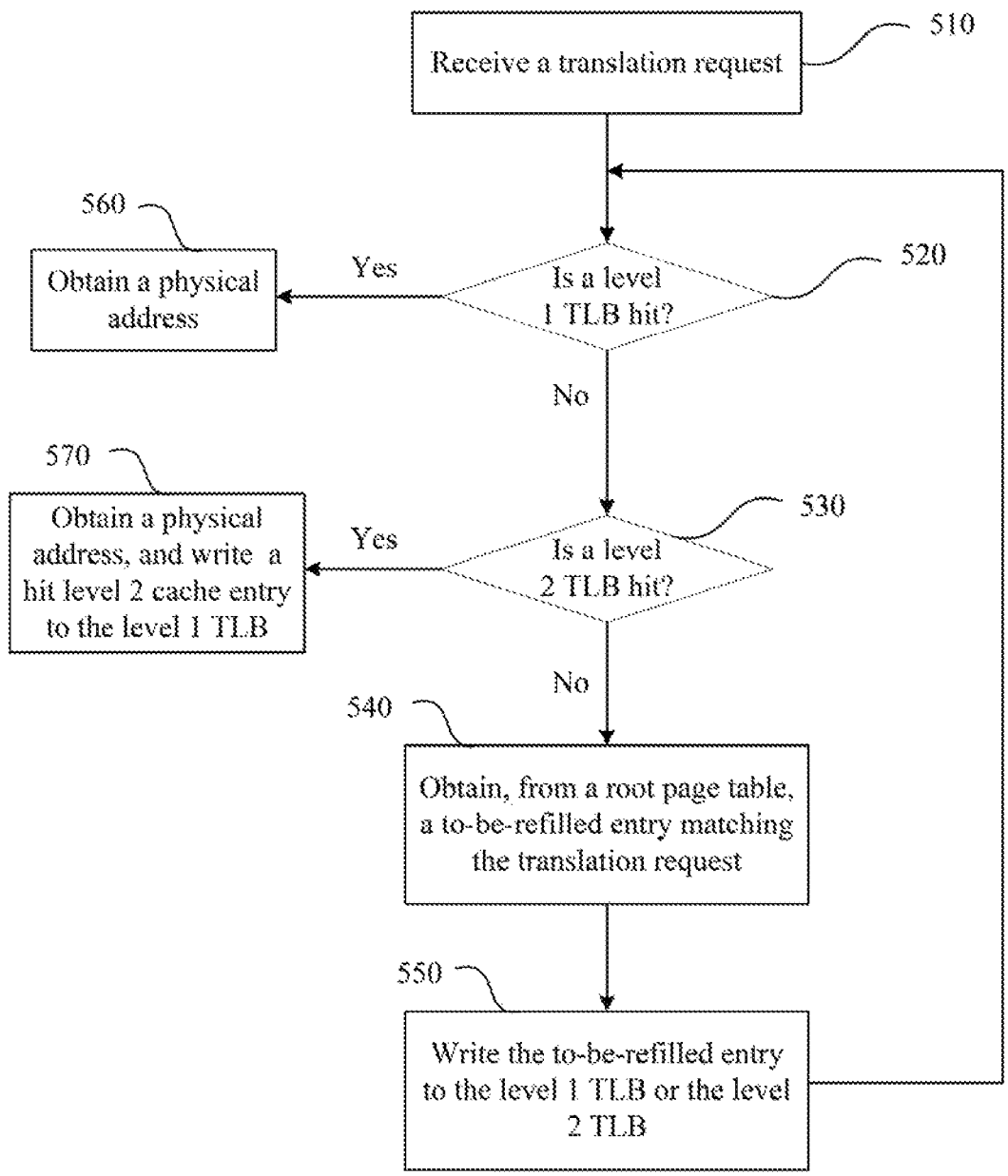
FIG. 5 illustrates a schematic flowchart of address translation implemented by using a TLB.

FIG. 5 illustrates a schematic flowchart of a storage management method according to an embodiment of the present invention. With reference to the embodiments shown in FIG. 3 to FIG. 5, the following exemplarily describes a process of translating a virtual address into a physical address.

As shown in FIG. 3, the storage management unit 105 includes a level 1 translation look-aside buffer TLB 1, and a level 2 translation look-aside buffer TLB 2. The level 1 translation look-aside buffer TLB 1 stores m1 level 1 cache entries, and the level 2 translation look-aside buffer TLB 2 stores m2 level 2 cache entries, so that a total quantity of cache entries that the storage management unit 105 can provide is equal to m_all=m1+m2. As described above and below, this embodiment of the present invention is not limited thereto.

Step 510 shown in FIG. 5: Receive a translation request. The translation request specifies a to-be-translated virtual address, for example, a virtual address of a pre-fetch instruction or a virtual address of a load instruction.

Step 520 in FIG. 5: Search each level 1 cache entry for a virtual address tag matching a virtual page number of the to-be-translated virtual address, to determine whether a level 1 translation look-aside buffer TLB 1 is hit.

The process may be implemented by comparing each data bit of the virtual page number of the to-be-translated virtual address with each data bit in a virtual address tag of each level 1 cache entry. If a virtual address tag of a level 1 cache entry is consistent with the virtual page number of the to-be-translated virtual address, and the level 1 cache entry is in a valid state (that is, the level 1 cache entry may be used for translation, for example, a validity bit of the level 1 cache entry is on a valid level), it indicates that the level 1 translation look-aside buffer TLB 1 is hit, and then step 560 is performed; or if none of virtual address tags of level 1 cache entries is consistent with the virtual page number of the to-be-translated virtual address, the level 1 translation look-aside buffer TLB 1 is not hit, and then step 530 is performed.

As described above, a page size to which each level 1 cache entry is mapped may be different, and a size flag of each level 1 cache entry may indicate a quantity of valid bits of a corresponding virtual address tag.

As an example, when the quantity of valid bits of the compared virtual address tag of the level 1 cache entry is 8, the size flag is set to 0; the virtual address tag of the level 1 cache entry is compared with higher 8 bits of the to-be-translated virtual address; and if they are consistent, it is determined that the level 1 cache entry matches the to-be-translated virtual address, or else, they do not match. When the quantity of valid bits of the compared virtual address tag of the level 1 cache entry is 7, the size flag is set to 1; the virtual address tag of the level 1 cache entry is compared with higher 7 bits of the to-be-translated virtual address; and if they are consistent, it is determined that the level 1 cache entry matches the to-be-translated virtual address, or else, they do not match.

It should be noted that, terms such as "high 8 bits" and "high 7 bits" are only an example, and are used merely for restricting the quantity of bits in the to-be-translated virtual address for comparing with each virtual address tag to be consistent with the quantity of valid bits of the virtual address tag, and may be distributed in other positions of the virtual address in other examples, and are used to indicate at least one part of the virtual page number of the virtual address.

In some embodiments, when step 520 is performed, if a level 1 cache entry is hit, the search process may be stopped, and there is no need to continue to compare virtual address tags of remaining level 1 cache entries with the to-be-translated virtual address, to save resources.

If the level 1 translation look-aside buffer TLB 1 is hit, in step 560 shown in FIG. 5, a physical address may be generated based on the hit level 1 cache entry, so that the virtual address is translated into the physical address by using the level 1 translation look-aside buffer TLB 1. As described above, in the process of generating the physical address, a physical address tag of the hit cache entry and an intra-page offset of the to-be-translated virtual address may be combined into the corresponding physical address.

Because the level 1 translation look-aside buffer TLB 1 is hit, only a maximum of m1 virtual address tags need to be compared with the virtual page number of the to-be-translated virtual address. In comparison with a conventional solution to searching, based on a to-be-translated virtual address, m_all cache entries provided by a storage management unit, for a matched cache entry, this embodiment of the present disclosure can reduce time required for searching for a cache entry to some extent, and therefore improve efficiency of a processor.

If the level 1 translation look-aside buffer TLB 1 is not hit, in step 530 shown in FIG. 5, the level 2 translation look-aside buffer TLB 2 may continue to be searched for a level 2 cache entry matching the to-be-translated virtual address, that is, a search is performed in each level 2 cache entry for a virtual address tag matching the virtual page number of the to-be-translated virtual address, to determine whether the level 2 translation look-aside buffer TLB 2 is hit.

Similarly to step 520, in step 530, each data bit of the virtual page number of the to-be-translated virtual address may be compared with each data bit in the virtual address tag of each level 2 cache entry; and if a virtual address tag of a level 2 cache entry is consistent with the virtual page number of the to-be-translated virtual address, and the level 2 cache entry is in the valid state (that is, the level 2 cache entry may be used for translation, for example, a validity bit of the level 2 cache entry is on a valid level), it indicates that the level 2 translation look-aside buffer TLB 2 is hit, and then step 570 is performed; or if none of virtual address tags of level 2 cache entries is consistent with the virtual page number of the to-be-translated virtual address, the level 2 translation look-aside buffer TLB 2 is not hit, and then step 550 is performed.

As described above, a page size to which each level 2 cache entry is mapped may be different, and a size flag of each level 2 cache entry may indicate a quantity of valid bits of a corresponding virtual address tag.

In some embodiments, when step 530 is performed, if a level 2 cache entry is hit, the search process may be stopped, and there is no need to continue to compare virtual address tags of remaining level 2 cache entries with the to-be-translated virtual address, to save resources.

If the level 2 translation look-aside buffer TLB 2 is hit, in step 570 shown in FIG. 5, a physical address may be generated based on the hit level 2 cache entry, so that the virtual address is translated into the physical address by using the level 2 translation look-aside buffer TLB 2. As described above, in the process of generating the physical address, a physical address tag of the hit cache entry and an intra-page offset of the to-be-translated virtual address may be combined into the corresponding physical address.

A difference from step 560 lies in that, in step 570, if the level 2 translation look-aside buffer TLB 2 is hit, the control unit 52 may interchange the hit level 2 cache entry with a level 1 cache entry in the level 1 translation look-aside buffer TLB 1, so that the currently hit level 2 cache entry is written to the level 1 translation look-aside buffer TLB 1 as a new level 1 cache entry. Therefore, in an environment with good access locality, a hit rate of the level 1 translation look-aside buffer TLB 1 is further increased, time required for determining whether each cache entry is hit in the storage management unit is reduced, and efficiency of the processor is improved.

In step 570, the control unit 52 may select, based on a preset algorithm, a level 1 cache entry that needs to be interchanged with the currently hit level 2 cache entry. The control unit 52 uses, for example, a level 1 cache entry temporarily stored and selected by a register and the currently hit level 2 cache entry, so that the temporarily stored level 1 cache entry can be written to a corresponding position of the level 2 translation look-aside buffer TLB 2, and that the currently hit level 2 cache entry is written to the level 1 translation look-aside buffer TLB 1 as a new level 1 cache entry.

The preset algorithm is, for example, the LRU algorithm described above. A least recently used (which may also be referred to as least recently hit) level 1 cache entry may be selected based on a reference flag of each level 1 cache entry, and the level 1 cache entry is written to the level 2 translation look-aside buffer TLD 2, so that the level 1 cache entry is interchanged with the currently hit level 2 cache entry.

In other more simplified embodiments, alternatively, the preset algorithm may be a first in first out (FIFO) algorithm. A level 1 cache entry that needs to be replaced may be selected based on a sequence in which each level 1 cache entry is stored in the level 1 translation look-aside buffer. For example, a corresponding register may be set for the first in first out algorithm, where a sequence flag code is stored in the register, and the sequence flag code has an initial value (for example, 16'h0001). When detecting that the sequence flag code is the initial value, the control unit 52 may use a first level 1 cache entry written to the level 1 translation look-aside buffer, as a level 1 cache entry that needs to be replaced. Afterward, the sequence flag code in the register increases by one gradient (for example, left shift by one bit to change to 16'h0002). Therefore, when the first in first out algorithm is required next time, a second level 1 cache entry written to the level 1 translation look-aside buffer may be used as a level 1 cache entry that needs to be replaced, and so on.

In comparison with the FIFO algorithm, the LRU algorithm can select to use a level 1 cache entry of a low use frequency more accurately, and therefore has a lower impact on the hit rate of the level 1 translation look-aside buffer; however, in comparison with the LRU algorithm, the FIFO algorithm has a simpler operation process, and can be implemented without occupying excessive software and hardware resources and time resources, and has a higher response speed. Therefore, the FIFO algorithm or the LRU algorithm may be selected based on an actual requirement to implement step 570.

However, this embodiment of the present disclosure is not limited thereto. The preset algorithm may further select, based on a size flag of the currently hit level 2 cache entry, a level 1 cache entry that needs to be replaced, to ensure that the size flag of the replaced level 1 cache entry is consistent with the size flag of the currently hit level 2 cache entry, or ensure that a page size indicated by the size flag of the replaced level 1 cache entry is less than or equal to a page size to which the size flag of the currently hit level 2 cache entry is mapped, to avoid reduction of an address range mapped in the level 1 translation look-aside buffer.

If the level 2 translation look-aside buffer TLB 2 is not hit, in step 540 shown in FIG. 5, a root page table (stored in a storage device such as a memory or a hard disk) may be searched for a to-be-refilled entry that matches the to-be-translated virtual address, and the to-be-refilled entry is written to the level 1 translation look-aside buffer TLB 1 or the level 2 translation look-aside buffer TLB 2, so that updating of multi-level TLBs can be implemented. Therefore, a cache entry that matches the to-be-translated virtual address is included in the updated multi-level TLBs.

In some embodiments, a cache entry that needs to be replaced with the to-be-refilled entry may be selected based on the reference flag of each cache entry in the multi-level TLBs, and the replaced cache entry may be a level 1 cache entry or a level 2 cache entry. In other embodiments, a level 2 cache entry that needs to be replaced may be selected from the level 2 translation look-aside buffer TLB 2 preferentially. This embodiment of the present disclosure is not limited thereto. For example, in step 540, a cache entry mapped to a small page size may be selected based on the size flag, as a cache entry that needs to be replaced with the to-be-refilled entry.

In some embodiments, after determining that the level 2 translation look-aside buffer TLB 2 is not hit, the address translation unit 51 may first generate mismatch information (which includes at least the virtual page number of the to-be-translated virtual address, or may include all bits of the to-be-translated virtual address) based on the to-be-translated virtual address, and then access the root page table based on the mismatch information, to search, based on the mismatch information, for an entry matching the to-be-translated virtual address, and use the entry as the to-be-refilled entry.

In some embodiments, after step 550 is performed, a translation request (corresponding to the same virtual address as the translation request in step 510) may be reinitiated, and correspondingly steps 520 and 560 or steps 520, 530, and 570 are performed. Therefore, the updated level 1 translation look-aside buffer TLB 1 or level 2 translation look-aside buffer TLB 2 is used to perform translation to obtain the corresponding physical address.

In other embodiments, after step 550 is performed, alternatively, the updated cache entry in the level 1 translation look-aside bufferTLB 1 or level 2 translation look-aside buffer TLB 2 may be directly used to translate the to-betranslated virtual address, to obtain the corresponding physical address and omit a process of searching for each cache entry again.

The foregoing mainly describes this embodiment of the present invention by using two-level TLBs as an example. However, this embodiment of the present invention is not limited thereto, and at least three-level TLBs may be further disposed in the storage management unit 105 based on the example of the two-level TLBs provided by this embodiment of the present disclosure.

For example, the storage management unit 105 includes a level 1 translation look-aside buffer TLB 1, a level 2 translation look-aside buffer TLB 2, and a level 3 translation look-aside buffer TLB 3. The address translation unit 51 may search, in a sequence of priorities of the level 1 to 3 translation look-aside buffers, for a cache entry matching the translation request, that is, first search the level 1 translation look-aside buffer TLB 1 for a level 1 cache entry matching the translation request, and if such a level 1 cache entry exists, implement address translation directly based on the hit level 1 cache entry, or else, continue to search the level 2 translation look-aside buffer TLB 2 for a level 2 cache entry matching the translation request, and if the level 2 translation look-aside buffer TLB 2 is still not hit, continue to search the level 3 translation look-aside buffer TLB 3 for a level 3 cache entry matching the translation request; and if the level 2 translation look-aside buffer TLB 2 or the level 3 translation look-aside buffer TLB 3 is hit, interchange the hit cache entry with the selected level 1 cache entry, to increase a hit rate of the level 1 translation look-aside buffer TLB 1.

In some embodiments, a quantity of cache entries provided by the level 1 translation look-aside buffer (preferentially determined to be hit or not) in the multi-level TLBs is less than a quantity of cache entries provided by any other-level translation look-aside buffer. Therefore, the quantity of level 1 cache entries provided by the level 1 translation look-aside buffer is reduced, and time for searching for the level 1 cache entry is reduced. In a further optimized embodiment, quantities of cache entries provided by the level 1 to the last level translation look-aside buffers in the multi-level TLBs may increase in sequence.

In the foregoing embodiments, a plurality of cache entries provided by the storage management unit 105 are divided into a plurality of level 1 cache entries and a plurality of level 2 cache entries in a unified manner. However, this embodiment of the present invention is not limited thereto. For example, the storage management unit 105 may include a plurality of translation look-aside buffers TLBs (for example an instruction TLB and a data TLB), where one translation look-aside buffer or some translation look-aside buffers may include several level 1 cache entries and several level 2 cache entries, and another translation look-aside buffer or other translation look-aside buffers may not be divided into a multi-level structure, but only include several cache entries having a same search priority. The cache entries having the same search priority may be cache entries of a high access frequency.

Up to now, a method for implementing address translation by using multi-level TLBs has been described by using examples. A storage management method provided by an embodiment of the present invention is also described in the foregoing embodiments.

When the processor executes a program segment, based on an access locality principle of the program, regardless of data access or instruction access, continuous virtual addresses accessed by the processor are generally mapped to continuous physical addresses. Therefore, as can be known from the paging management mechanism, continuity of page allocation is very strong. Phenomena generated by the access locality principle may include: time locality, that is, a piece of information being accessed may be probably accessed again in a near future, and this phenomenon may be caused by a design such as a program cycle or stack; space locality, that is, information being used and information to be used may be continuous or adjacent in addresses; and sequence locality, that is, most instructions are executed sequentially, and arrays may also be accessed in a continuous storage sequence.

In a conventional solution, in each address translation process, a search needs to be performed among a plurality of cache entries provided by a storage management unit, one by one for a cache entry matching a to-be-translated virtual address. A quantity of cache entries limits a range of addresses that the storage management unit can directly translate. For a high-performance processor, a range of virtual addresses dynamically accessed by a program may be very wide. To improve translation efficiency as much as possible, a total quantity of cache entries stored in the storage management unit is increased continuously. On the other hand, the high-performance processor also has a very high frequency requirement, and address translation is an operation process that occurs very frequently. Therefore, a long latency generated by the address translation process hinders further improvement of the frequency of the processor, and high power consumption is also generated in a process of searching for a cache entry matching a translation request among a plurality of cache entries. Especially in the full associative mode mentioned above, each cache entry in the storage management unit may need to be compared with a virtual page number of the to-be-translated virtual address, and a cache entry is selected from a plurality of hit cache entries and used for the address translation process. Therefore, address translation efficiency is low, massive power consumption is generated, efficiency and performance of the processor are affected, and improvement of the efficiency of the processor is hindered.

In comparison with the conventional solution, the storage management method and storage management apparatus provided by the embodiments of the present invention perform a hierarchical search among the plurality of cache entries based on the virtual address specified by the translation request. Because a total quantity of the level 1 cache entries is less than a total quantity of the cache entries provided by the storage management apparatus, if a level 1 cache entry can be hit, a quantity of cache entries that need to be matched and compared with the virtual address specified by the translation request may be reduced obviously. Therefore, time required by searching for the cache entry in the address translation process is reduced, efficiency, frequency, and performance of the processor are improved, and power consumption generated in the address translation process is reduced.

In some preferred embodiments, if none of the level 1 cache entries is hit and a level 2 cache entry is hit, a level 1 cache entry that is used infrequently may be replaced with the hit level 2 cache entry. This further increases a hit rate of the plurality of level 1 cache entries, and further reduces time required by searching for the cache entry in the address translation process.

This application further discloses a computer-readable storage medium that stores a computer-executable instruction. When the computer-executable instruction is executed by a processor, the processor is enabled to perform the method according to each embodiment in this specification.

In addition, this application further discloses a computer system, where the computer system includes an apparatus configured to implement the method of each embodiment in this specification.

It should be appreciated that the foregoing are only preferred embodiments of the present invention and not intended to limit the present invention. For those skilled in the art, there are many variations of embodiments in this specification. Any modification, equivalent replacement, improvement, and the like within the spirit and principle of the present invention shall fall within the protection scope of the present invention.

For example, although only the method for translating a virtual address into a physical address by using multi-level TLBs is described in this specification, the TLB on each level is not limited to storing a relationship between the virtual address and the physical address. Before the physical address is obtained, cache entries in some TLBs may further translate the virtual address into a translated address, where the translated address may be translated into a physical address through further translation. A translated address space may also be divided into a plurality of parts in the paging management mechanism, where each part is referred to as a translated page. In addition, although a cache entry in a TLB in some embodiments is used to translate a virtual page in the virtual address space, a cache entry in a TLB in other embodiments may alternatively be used to translate other types of addresses.

For another example, in some embodiments, the storage management unit may include an enable register. At least one numeric value in the enable register is configured to set enabling and disabling of the storage management unit.

It should be understood that the embodiments in this specification are all described in a progressive manner. For same or similar parts in the embodiments, mutual reference may be made, and each embodiment focuses on a difference from other embodiments. In particular, the method embodiment is basically similar to the method described in the apparatus embodiment and system embodiment, and therefore is described briefly. For related parts, reference may be made to partial descriptions in the other embodiments.

It should be understood that specific embodiments in this specification are described above. Other embodiments fall within the scope of the claims. In some cases, actions or steps described in the claims may be performed in a sequence different from those of the embodiments, and expected results can still be achieved. In addition, illustrated specific sequences or continuous sequences are not necessarily required for the processes described in the drawings to achieve the expected results. In some implementations, multi-task processing and parallel processing are also allowed or may be advantageous.

It should be understood that a component described in a singular form in this specification or only one component displayed in the drawings does not represent that there is only one such component. In addition, separate modules or components described or illustrated in this specification may be combined into a single module or component, and a single module or component described or illustrated in this specification may be split into a plurality of modules or components.

It should also be understood that the terms and expressions used in this specification are used for description only. One or more embodiments in this specification should not be limited to the terms and expressions. Use of the terms and expressions does not imply exclusion of any indicative and descriptive (or partial) equivalent features. It should be recognized that various modifications that may exist shall also be included in the scope of the claims. Other modifications, variations, and replacements may also exist. Correspondingly, the claims shall be deemed to cover all these equivalents.

What is claimed is:

1. A storage management apparatus, comprising:
   at least one translation look-aside buffer, configured to store a plurality of cache entries, wherein the plurality of cache entries comprises a plurality of level 1 cache entries and a plurality of level 2 cache entries, wherein each of the plurality of level 1 cache entries is different from each of the plurality of level 2 cache entries; and
   an address translation unit, coupled to the at least one translation look-aside buffer, and adapted to:
      translate, based on one of the plurality of level 1 cache entries, a virtual address specified by a translation request into a corresponding translated address when a virtual page number of the virtual address is consistent with a virtual address tag of one of the plurality of level 1 cache entries, thereby indicating one of the plurality of level 1 cache entries being hit, or when the translation request does not hit any one of the plurality of level 1 cache entries,
      translate, based on one of the plurality of level 2 cache entries, the virtual address specified by the translation request into a corresponding translated address,
      generate a mismatch information based on the virtual address when the translation request does not hit any one of the plurality of level 2 cache entries, wherein the mismatch information comprises the virtual page number of the virtual address, and
      provide the mismatch information to a control unit, wherein the control unit obtains a to-be-refilled entry.

2. The storage management apparatus according to claim 1, wherein in the at least one translation look-aside buffer, a quantity of level 1 cache entries is less than or equal to a quantity of level 2 cache entries.

3. The storage management apparatus according to claim 1, wherein each data bit in the virtual page number of the virtual address is compared with each data bit in the virtual address tag of each of the plurality of level 1 cache entries to indicate that the translation request hits any one of the plurality of level 1 cache entries.

4. A processor, comprising the storage management apparatus according to claim 1.

5. The processor according to claim 4, further comprising an instruction pre-fetch unit, wherein the instruction pre-fetch unit provides the translation request to the address translation unit, wherein the translation request specifies a virtual address of a pre-fetch instruction; and
   wherein the address translation unit communicates with a first translation look-aside buffer in the at least one translation look-aside buffer, and provides a translated address of the pre-fetch instruction to the instruction pre-fetch unit based on a cache entry provided by the first translation look-aside buffer.

6. The processor according to claim 5, further comprising a load/store unit, wherein the load/store unit provides the translation request to the address translation unit, wherein the translation request specifies a virtual address of a memory access instruction; and
   wherein the address translation unit communicates with a second translation look-aside buffer in the at least one translation look-aside buffer, and provides a translated address of the memory access instruction to the load/store unit based on a cache entry provided by the second translation look-aside buffer.

7. The storage management apparatus according to claim 1, wherein each cache entry, of the plurality of cache entries, is stored in a plurality of registers, and wherein the plurality of registers comprises:
a first register, configured to store the virtual address tag to indicate a virtual page mapped in the cache entry; and
a second register, configured to store a translated address tag to indicate a translated page to which the virtual page is mapped, wherein page sizes of the virtual page and the translated page mapped in each cache entry are consistent.

8. The storage management apparatus according to claim 7, further comprising the control unit, coupled to the address translation unit, adapted to:
when the virtual address specified by the translation request does not hit any one of virtual address tags in the plurality of cache entries, obtain, from a root page table, the to-be-refilled entry that matches the virtual address specified by the translation request; and
write the to-be-refilled entry to the at least one translation look-aside buffer.

9. The storage management apparatus according to claim 8, wherein the address translation unit is further adapted to:
determine whether the virtual address specified by the translation request hits the plurality of level 1 cache entries; when one of the plurality of level 1 cache entries is hit, translate, based on the hit level 1 cache entry, the virtual address specified by the translation request into a corresponding translated address;
when none of the plurality of level 1 cache entries is hit, determine whether the virtual address specified by the translation request hits the plurality of level 2 cache entries; and
when one of the plurality of level 2 cache entries is hit, translate, based on the hit level 2 cache entry, the virtual address specified by the translation request into a corresponding translated address.

10. The storage management apparatus according to claim 8, wherein the control unit is further adapted to:
when the plurality of level 1 cache entries are not hit and one of the plurality of level 2 cache entries is hit, select one of the plurality of level 1 cache entries based on a preset algorithm, and replace the selected one of the plurality of level 1 cache entries with the hit level 2 cache entry.

11. The storage management apparatus according to claim 10, wherein when the plurality of level 1 cache entries are not hit and one of the plurality of level 2 cache entries is hit, the control unit is further adapted to write the replaced level 1 cache entry as a level 2 cache entry to the at least one translation look-aside buffer.

12. The storage management apparatus according to claim 10, wherein the plurality of registers further comprises:
a fourth register, configured to store a size flag to indicate the page size of the virtual page or the translated page.

13. The storage management apparatus according to claim 12, wherein when the plurality of level 1 cache entries are not hit and one of the plurality of level 2 cache entries is hit, the control unit is further adapted to select the to-be-replaced level 1 cache entry based on the size flag, so that page sizes to which the hit level 2 cache entry and the to-be-replaced level 1 cache entry are mapped are equal.

14. The storage management apparatus according to claim 10, wherein the plurality of registers further comprises:
a third register, configured to store a reference flag to indicate whether the cache entry is a least recently hit cache entry.

15. The storage management apparatus according to claim 14, wherein when selecting a to-be-replaced plurality of level 1 cache entry based on the preset algorithm, wherein the control unit is adapted to select a least recently hit level 1 cache entry based on the reference flag of each level 1 cache entry.

16. The storage management apparatus according to claim 14, wherein when selecting the one of the plurality of level 1 cache entries based on the preset algorithm, the control unit is adapted to select a first written level 1 cache entry based on a sequence in which the plurality of level 1 cache entries are written to the at least one translation look-aside buffer.

17. A computer system, comprising:
the processor according to claim 4; and
a memory, coupled to the processor.

18. A storage management method, comprising:
providing a plurality of cache entries, wherein the plurality of cache entries comprises a plurality of level 1 cache entries and a plurality of level 2 cache entries, wherein each of the plurality of level 1 cache entries is different from each of the plurality of level 2 cache entries;
receiving a translation request, wherein the translation request specifies a to-be-translated virtual address;
translating, based on one of the plurality of level 1 cache entries, the virtual address specified by the translation request into a corresponding translated address when a virtual page number of the virtual address is consistent with a virtual address tag of one of the plurality of level 1 cache entries, thereby indicating one of the plurality of level 1 cache entries being hit, or when the translation request does not hit any one of the plurality of level 1 cache entries, translating, based on one of the plurality of level 2 cache entries, the virtual address specified by the translation request into a corresponding translated address;
generating a mismatch information based on the virtual address, when the translation request does not hit any one of the plurality of level 2 cache entries, and wherein the mismatch information comprises the virtual page number of the virtual address, and
providing the mismatch information to a control unit, wherein the control unit obtains a to-be-refilled entry.

19. The storage management method according to claim 18, wherein each cache entry, of the plurality of cache entries, is stored in a plurality of registers, and wherein the plurality of registers comprises:
a first register, configured to store the virtual address tag to indicate a virtual page mapped in the cache entry; and
a second register, configured to store a translated address tag to indicate a translated page to which the virtual page is mapped, wherein page sizes of the virtual page and the translated page mapped in each cache entry are consistent.

20. The storage management method according to claim 19, further comprising:
when the virtual address specified by the translation request does not hit any one of virtual address tags in the plurality of cache entries, obtaining, from a root page table, the to-be-refilled entry that matches the virtual address specified by the translation request; and writing the to-be-refilled entry as a level 1 cache entry or a level 2 cache entry to at least one translation lookaside buffer configured to store the plurality of cache entries.

21. The storage management method according to claim 20, wherein the step of translating, based on one of the plurality of level 1 cache entries or on one of the plurality of level 2 cache entries, the virtual address specified by the translation request into a corresponding translated address comprises:

determining whether the virtual address specified by the translation request hits the plurality of level 1 cache entries; when one of the plurality of level 1 cache entries is hit, translating, based on the hit level 1 cache entry, the virtual address specified by the translation request into a corresponding translated address;

when none of the plurality of level 1 cache entries is hit, determining whether the virtual address specified by the translation request hits the plurality of level 2 cache entries; and when one of the plurality of level 2 cache entries is hit, translating, based on the hit level 2 cache entry, the virtual address specified by the translation request into a corresponding translated address.

* * * * *